United States Patent [19]
Kofler et al.

[11] Patent Number: 5,985,013
[45] Date of Patent: Nov. 16, 1999

[54] ABLATIVE MATERIAL FOR FIRE AND HEAT PROTECTION AND A METHOD FOR PREPARATION THEREOF

[76] Inventors: Gregory Kofler, 75/8 Smilansky St., Netanya; Moisey Wassberg, 205/7 Yefet St., Jaffa, both of Israel

[21] Appl. No.: 09/007,626

[22] Filed: Jan. 15, 1998

[30] Foreign Application Priority Data

Jan. 15, 1997 [IL] Israel ........................................ 120011

[51] Int. Cl.⁶ .................................................... C09K 21/02
[52] U.S. Cl. ..................................... 106/18.11; 106/18.12; 106/18.23; 106/18.26; 106/18.27; 106/772; 106/DIG. 2; 252/62; 252/601; 428/920; 428/921
[58] Field of Search ............................. 106/18.11, 18.12, 106/18.26, 18.27, 18.23, 772, DIG. 2; 252/601, 62; 428/920, 921

[56] References Cited

U.S. PATENT DOCUMENTS

| | | | |
|---|---|---|---|
| 4,192,791 | 3/1980 | Self | 523/505 |
| 4,288,338 | 9/1981 | Phillips | 106/286.7 |
| 4,462,831 | 7/1984 | Raevsky et al. | 106/18.26 |
| 4,965,423 | 10/1990 | Seaborne | 219/759 |
| 5,340,612 | 8/1994 | Perito | 106/15.05 |

FOREIGN PATENT DOCUMENTS 258 064   3/1988   European Pat. Off. .

*Primary Examiner*—Anthony Green
*Attorney, Agent, or Firm*—Londa and Traub LLP

[57] ABSTRACT

A method and a mixture for preparing an ablative material for fire and heat protection is provided. The mixture includes calcium sulfate hemihydrate and a hydrated salt and the ablative material is prepared by adding water to the mixture.

9 Claims, 1 Drawing Sheet

ABLATIVE MATERIAL FOR FIRE AND HEAT PROTECTION AND A METHOD FOR PREPARATION THEREOF

FIELD OF THE INVENTION

The present invention relates to the field of fire and heat protection materials in general and to the field of fire and heat protective materials of the ablative type in particular.

BACKGROUND OF THE INVENTION

Heat protecting materials of the ablative type are known in the art. In contrast to regular heat insulating materials which afford heat protection due to their poor thermal conductivity, heat ablative materials provide thermal protection by absorbing heat, without a large increase of their temperature, for a limited period of time. Thus, in contrast to regular thermal insulating materials, heat ablative materials are for one time use. U.S. Pat. No. 4,462,831 to Raevsky et al. discloses a fire and heat protective material of the ablative type composed of an organic binder and a filler of hydrated aluminum sulfate.

Usually, heat ablative materials absorb heat due to endothermal reactions which take place upon heating. One such endothermal reaction is dehydration which is the loss of hydration water. In addition, other processes can contribute to the absorption of heat, such as the evaporation of the water molecules released in the dehydration reaction and the heating of any gases which are emitted during decomposition of the ablative material.

One type of heat ablative materials known in the art are hydrated inorganic salts. For example, gypsum which is calcium sulfate dihydrate ($CaSO_4.2H_2O$), is a heat ablative material well known in the art. When gypsum is heated from 20° C. to 1000° C., it's temperature keeps nearly constant within the range of 100–104° C. till the end of it's dehydration. After the dehydration is ended, gypsum substantially looses it's heat ablative property and the temperature increases quickly.

Heat ablative materials can be used for protection of heat sensitive materials such as ammunition, explosives, fuel and other combustible materials from exposure to intense heat. Such protection can be achieved by coating the container of the heat sensitive material with a layer of heat ablative material, or by storing heat sensitive materials and objects in a room or a case or a safe whose walls include a heat ablative material or are coated with a heat ablative material.

The efficiency of heat ablative compositions can be determined by measuring the time interval during which they can keep the temperature on one of their sides below a certain value while their other side is heated in a controlled way up to a certain predetermined temperature. This time interval is usually referred to as the time of heat protection.

Thus, heat ablative compositions having a long time of heat protection are desirable for providing extended heat protection periods.

SUMMARY OF THE PRESENT INVENTION

There is therefore provided in accordance with a preferred embodiment of the present invention, a mixture for preparing an ablative material for fire and heat protection, the ablative material is prepared by adding water to the mixture which includes calcium sulfate hemihydrate and a hydrated salt.

Further, in accordance with another preferred embodiment of the present invention, the amount of calcium sulfate hemihydrate in the mixture is approximately 50–70% parts by weight.

Still further, in accordance with another preferred embodiment of the present invention, the hydrated salt has a heat of fusion larger than 100 Kilojoule per kilogram.

Further, in accordance with still another preferred embodiment of the present invention, the hydrated salt is lithium nitrate trihydrate in an amount of 30–40% by weight of said mixture.

Further, in accordance with still another preferred embodiment of the present invention, the hydrated salt is sodium carbonate decahydrate in an amount of 35–40% by weight of said mixture.

Further, in accordance with still another preferred embodiment of the present invention, the hydrated salt is barium hydroxide octahydrate in an amount of 35–40% by weight of said mixture.

Further, in accordance with still another preferred embodiment of the present invention, the hydrated salt is sodium thiosulfate pentahydrate in an amount of 30–40% by weight of said mixture.

Further, in accordance with still another preferred embodiment of the present invention, the hydrated salt is nickel nitrate hexahydrate in an amount of 30–40% by weight of said mixture.

Further, in accordance with still another preferred embodiment of the present invention, the hydrated salt is zinc nitrate hexahydrate in an amount of 35–40% by weight of said mixture.

Further, in accordance with still another preferred embodiment of the present invention, the hydrated salt is sodium silicate pentahydrate in an amount of 30–40% by weight of said mixture.

Further, in accordance with still another preferred embodiment of the present invention, the hydrated salt is potassium fluoride dihydrate in an amount of 35–40% by weight of said mixture.

Further, in accordance with still another preferred embodiment of the present invention, the hydrated salt is calcium bromide hexahydrate in an amount of 35–40% by weight of said mixture.

Further, in accordance with still another preferred embodiment of the present invention, the hydrated salt is magnesium nitrate hexahydrate in an amount of 40% by weight of said mixture.

There is also provided, in accordance with another preferred embodiment of the present invention, a method for preparing a pre-cast form of ablative material for fire and heat protection from a mixture including calcium sulfate hemihydrate and a hydrated salt. The method includes dry mixing the ingredients of the mixture, adding water to the mixture in a quantity sufficient to yield a substantially homogenous castable wet mixture, casting the castable wet mixture into a suitable mold and drying the pre-cast form.

Still further, in accordance with yet another preferred embodiment of the present invention, the mixture further includes the setting retardants calcium hydroxide and sodium citrate dihydrate.

Further, in accordance with still another preferred embodiment of the present invention, the amount of calcium hydroxide in the mixture is less than 5% parts by weight, and the amount of sodium citrate dihydrate in the mixture is less than 0.2% parts by weight.

Still further, in accordance with another preferred embodiment of the present invention, the mixture further includes a filler.

Finally, in accordance with still another preferred embodiment of the present invention, the filler is perlite.

BRIEF DESCRIPTION OF THE DRAWINGS

The present invention will be understood and appreciated more fully from the following detailed description taken in conjunction with drawing, FIG. 1 which is a schematic diagram of a cross section illustrating the configuration of the oven, the ablative material and the temperature sensors as used in the determination of the time of heat protection of the various compositions of heat ablative materials of the present invention.

DETAILED DESCRIPTION OF A PREFERRED EMBODIMENT

Figure 1:
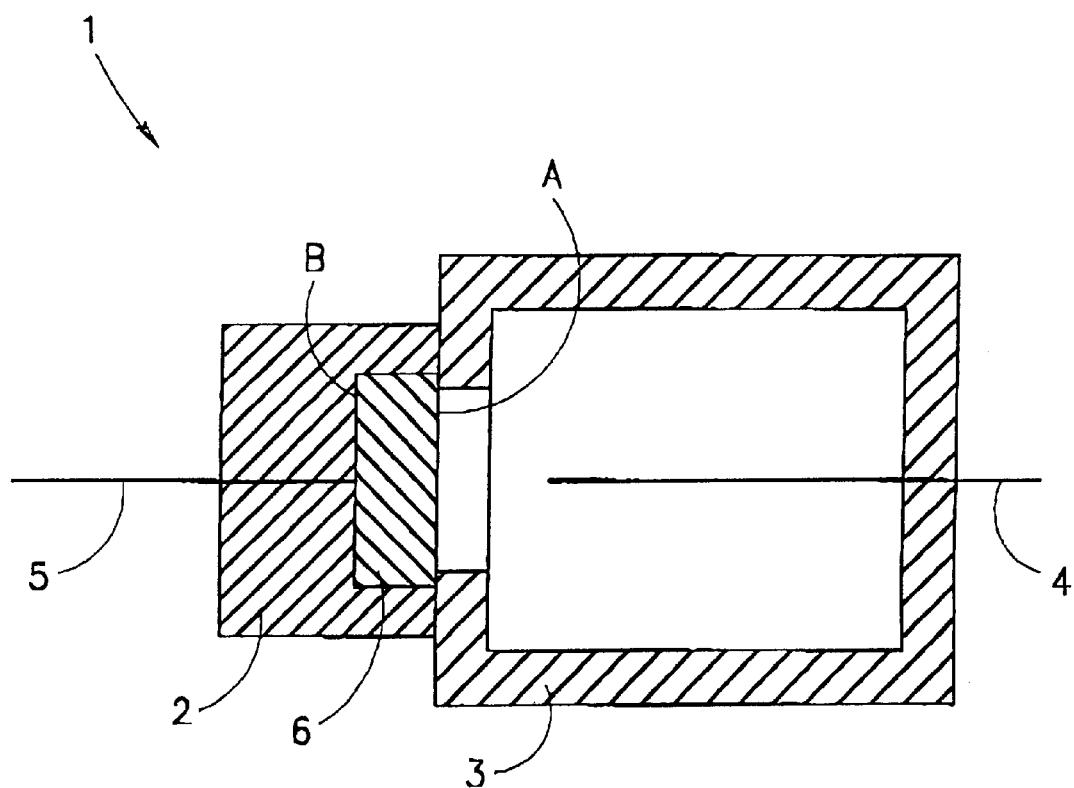

The present invention discloses mixtures for preparing various compositions of ablative materials based on gypsum and various hydrated salts which may also include additional additives such as setting retardants. The present inventors have found that the addition of different hydrated salts to gypsum significantly increases the time of heat protection of the resulting ablative materials relative to the time of heat protection of gypsum.

In accordance with a preferred embodiment of the present invention, all the heat ablative compositions disclosed hereinbelow were prepared as follows:

All the ingredients in powder form of approximately 100–150 mesh size were mixed together in a concrete mixer. Water was then added to the mixture and the mass was mixed again to achieve homogeneity and a plastic consistency suitable for casting. The resulting substantially homogeneous mixture was cast in metal molds to yield rectangular test tiles having the approximate dimensions of 185 mm length, 100 mm width and 30 mm thickness. Prior to testing the test tiles were left to harden for 28 days at 21–23° C.

The hardened tiles were tested to determine the time of heat protection by placing a tile in a muffle furnace illustrated in FIG. 1, to which reference is now made. FIG. 1 is a schematic diagram of a cross section illustrating the configuration of the muffle furnace, the ablative material and the temperature sensors as used in the determination of the time of heat protection of the various compositions of heat ablative materials of the present invention.

The test tile 6 was placed inside a recess in a heat insulated door 2 of a muffle furnace 1. One surface of the test tile 6, labeled A, was exposed to the inside of the furnace 1 while the opposite side of the test tile 6, labeled B, faced the insulated door 2. The temperature inside the furnace 1 was recorded by a thermocouple 4 and the temperature of the surface B was simultaneously recorded by a thermocouple 5.

The temperature inside the furnace was raised from 20° C. to 1000° C. in accordance with the UL 72 Standard for Safety—Tests for Fire Resistance of Record Protection Equipment published by Underwriters Laboratories Inc., N.Y., U.S.A. The heat protection time was defined as the time measured from the beginning of the heating of the furnace 1 till the surface B of the test tile 6 reached a temperature of 105° C.

The examples presented hereinafter are non-limiting examples demonstrating different aspects of the effects of the quantity and type of the hydrated salt, used as a part of the mixture for preparing the heat ablative material, on the time of heat protection of the resulting heat ablative material. All the quantities are expressed as percentage by weight.

It is noted that in all the examples disclosed hereinbelow, the gypsum which is present in the final composition of the heat ablative material is formed by the reaction of water, added to the mixture, with the calcium sulfate hemihydrate ($2CaSO_4.H_2O$), also known as plaster of Paris, which is included in the mixture.

It is further noted that the mixtures used for the preparation of heat ablative materials in experiments 1, 2 and 7 of TABLE 1, experiments 1, 2 and 7 of TABLE 2, experiments 1, 2 and 6 of TABLE 3, experiments 1,2 and 5 of TABLE 4, experiments 1,2 and 5 of TABLE 5, experiments 1,2 and 6 of TABLE 6, experiments 1,2 and 5 of TABLE 7, experiments 1,2 and 6 of TABLE 8, experiments 1,2 and 5 of TABLE 9, experiments 1,2 and 5 of TABLE 10, experiments 1–3 and 5–6 of TABLE 11, experiments 1 and 12 of TABLE 12 and mixture A of EXAMPLE 12, and the heat ablative materials prepared therefrom, do not represent the present invention and are given only for comparative purposes.

EXAMPLE 1

A number of experiments were carried out in which a series of mixtures for preparing heat ablative materials based on a mixture of plaster of Paris ($2CaSO_4.H_2O$) and small amounts of the setting retardants calcium hydroxide and sodium citrate dihydrate ($Na_3C_6H_5O_7.2H_2O$), as the major ablative component, and nickel nitrate hexahydrate ($Ni(NO_3)_2.6H_2O$) as a hydrated salt additive, were tested to determine the effect of increasing the amount of the hydrated salt additive nickel nitrate hexahydrate in the composition on the time of heat protection. All the heat ablative materials were prepared and tested as disclosed hereinabove. The results are summarized in Table 1.

TABLE 1

| | Parts by Weight (%) | | | | | |
|---|---|---|---|---|---|---|
| Exp. No. | $2CaSO_4.H_2O$ | $Ca(OH)_2$ | $Na_3C_6H_5O_7.2H_2O$ | $Ni(NO_3)_2.6H_2O$ | $T_H$ (min) | $R_T$ |
| 1 | 96 | 3.85 | 0.15 | — | 64.0 | 1.0 |
| 2 | 76 | 3.85 | 0.15 | 20 | 63.0 | 0.98 |
| 3 | 66 | 3.85 | 0.15 | 30 | 73.0 | 1.14 |
| 4 | 61 | 3.85 | 0.15 | 35 | 82.0 | 1.28 |
| 5 | 56 | 3.85 | 0.15 | 40 | 87.0 | 1.28 |
| 6 | 51 | 3.85 | 0.15 | 45 | 73.0 | 1.14 |
| 7 | 46 | 3.85 | 0.15 | 50 | 46.0 | 0.71 |

Wherein $T_H$ represents the time of heat protection and $R_T$ represents ratio of the $T_H$ value measured in a particular experiment and the $T_H$ value of the control experiment (experiment No. 1 of Table 1).

The results of Table 1 indicate that additions of the hydrated salt nickel nitrate hexahydrate of up to 40% of the mixture increase the time of heat protection of the resulting ablative material. The effect is maximal at approximately 40% nickel nitrate hexahydrate which increases the time of heat of protection by approximately 36% relative to the control value of Experiment No. 1 of Table 1. increasing the amount of nickel nitrate hexahydrate in the mixture beyond 40% does not yield a further increase in the time of heat protection.

It is noted that, all the Tables hereinafter except for Table 2, use the same values obtained in experiment 1 of Table 1 as the control experiment for the calculation of the value of $R_T$.

EXAMPLE 2

A number of experiments were carried out in which the setting retardants of Example 1 were omitted to test the effect of increasing the amount of the hydrated salt additive nickel nitrate hexahydrate in the mixture on the time of heat protection in the absence of setting retardants. All the ablative materials were prepared and tested as disclosed hereinabove except for the omission of the setting retardants. The results are summarized in Table 2.

TABLE 2

| | Parts by Weight (%) | | | | | |
|---|---|---|---|---|---|---|
| Exp. No. | $2CaSO_4.H_2O$ | $Ca(OH)_2$ | $Na_3C_6H_5O_7.2H_2O$ | $Ni(NO_3)_2.6H_2O$ | $T_H$ (min) | $R_T$ |
| 1 | 100 | — | — | — | 66.0 | 1.0 |
| 2 | 80 | — | — | 20 | 64.0 | 0.97 |
| 3 | 70 | — | — | 30 | 75.0 | 1.14 |
| 4 | 65 | — | — | 35 | 81.0 | 1.23 |
| 5 | 60 | — | — | 40 | 87.0 | 1.32 |
| 6 | 55 | — | — | 45 | 73.0 | 1.11 |
| 7 | 50 | — | — | 50 | 46.0 | 0.7 |

Wherein $T_H$ represents the time of heat protection and $R_T$ represents the ratio of the $T_H$ value measured in a particular experiment and the $T_H$ value of the control experiment of Table 2 (experiment No. 1 of Table 2).

The results of Tables 1 and 2 indicate that roughly similar results are obtained in the presence or in the absence of the setting retardants and that in Examples 1 and 2 the time of heat protection is maximal for heat ablative materials produced from mixtures including approximately 40% nickel nitrate hexahydrate.

EXAMPLE 3

A number of experiments were carried out in which a series of mixtures for preparing ablative materials based on a mixture of plaster of Paris ($2CaSO_4.H_2O$) and small amounts of the setting retardants calcium hydroxide and sodium citrate dihydrate, as the major ablative component, and lithium nitrate trihydrate as a hydrated salt additive, were tested to determine the effect of increasing the amount of lithium nitrate trihydrate in the composition on the time of heat protection. All the heat ablative materials were prepared and tested as disclosed hereinabove. The results are summarized in Table 3.

TABLE 3

| | Parts by Weight (%) | | | | | |
|---|---|---|---|---|---|---|
| Exp. No. | $2CaSO_4.H_2O$ | $Ca(OH)_2$ | $Na_3C_6H_5O_7.2H_2O$ | $LiNO_3.3H_2O$ | $T_H$ (min) | $R_T$ |
| 1 | 96 | 3.85 | 0.15 | — | 64 | 1.0 |
| 2 | 71 | 3.85 | 0.15 | 25 | 44.0 | 0.69 |
| 3 | 66 | 3.85 | 0.15 | 30 | 76.0 | 1.19 |
| 4 | 61 | 3.85 | 0.15 | 35 | 87.0 | 1.36 |

TABLE 3-continued

| | Parts by Weight (%) | | | | | |
|---|---|---|---|---|---|---|
| Exp. No. | $2CaSO_4.H_2O$ | $Ca(OH)_2$ | $Na_3C_6H_5O_7.2H_2O$ | $LiNO_3.3H_2O$ | $T_H$ (min) | $R_T$ |
| 5 | 56 | 3.85 | 0.15 | 40 | 115.0 | 1.8 |
| 6 | 51 | 3.85 | 0.15 | 45 | 32.0 | 0.5 |

Wherein $T_H$ and $R_T$ are as disclosed for Table 1.

EXAMPLE 4

A number of experiments were carried out in which a series of mixtures for preparing ablative materials based on a mixture of plaster of Paris ($2CaSO_4.H_2O$) and small amounts of the setting retardants calcium hydroxide and sodium citrate dihydrate, as the major ablative component, and sodium carbonate decahydrate as a hydrated salt additive, were tested to determine the effect of increasing the amount of sodium carbonate decahydrate in the composition on time of heat protection. All the ablative materials were prepared and tested as disclosed hereinabove. The results are summarized in Table 4.

TABLE 4

| | Parts by Weight (%) | | | | | |
|---|---|---|---|---|---|---|
| Exp. No. | $2CaSO_4.H_2O$ | $Ca(OH)_2$ | $Na_3C_6H_5O_7.2H_2O$ | $Na_2CO_3.10H_2O$ | $T_H$ (min) | $R_T$ |
| 1 | 96 | 3.86 | 0.15 | — | 64.0 | 1.0 |
| 2 | 66 | 3.85 | 0.15 | 30 | 42.0 | 0.66 |
| 3 | 61 | 3.85 | 0.15 | 35 | 79.0 | 1.23 |
| 4 | 56 | 3.85 | 0.15 | 40 | 112.0 | 1.75 |
| 5 | 51 | 3.85 | 0.15 | 45 | 41.0 | 0.64 |

Wherein $T_H$ and $R_T$ are as disclosed for Table 1.

EXAMPLE 5

A number of experiments were carried out in which a series of mixtures for preparing heat ablative materials based on a mixture of plaster of Paris ($2CaSO_4.H_2O$) and small amounts of the setting retardants calcium hydroxide and sodium citrate dihydrate, as the major ablative component, and barium hydroxide octahydrate as a hydrated salt additive, were tested to determine the effect of increasing the amount of the barium hydroxide octahydrate in the composition on the time of heat protection. All the heat ablative materials were prepared and tested as disclosed hereinabove. The results are summarized in Table 5.

TABLE 5

| | Parts by Weight (%) | | | | | |
|---|---|---|---|---|---|---|
| Exp. No. | $2CaSO_4.H_2O$ | $Ca(OH)_2$ | $Na_3C_6H_5O_7.2H_2O$ | $Ba(OH)_2.8H_2O$ | $T_H$ (min) | $R_T$ |
| 1 | 96 | 3.85 | 0.15 | — | 64.0 | 1.0 |
| 2 | 66 | 3.85 | 0.15 | 30 | 45.0 | 0.7 |
| 3 | 61 | 3.85 | 0.15 | 35 | 83.0 | 1.3 |
| 4 | 56 | 3.85 | 0.15 | 40 | 106.0 | 1.66 |
| 5 | 51 | 3.85 | 0.15 | 45 | 47.0 | 0.73 |

Wherein $T_H$ and $R_T$ are as disclosed for Table 1.

EXAMPLE 6

A number of experiments were carried out in which a series of mixtures for preparing heat ablative materials based on a mixture of plaster of Paris ($2CaSO_4.H_2O$) and small amounts of the setting retardants calcium hydroxide and sodium citrate dihydrate, as the major ablative component, and sodium thiosulfate pentahydrate as a hydrated salt additive, were tested to determine the effect of increasing the amount of sodium thiosulfate pentahydrate in the composition on the time of heat protection. All the heat ablative materials were prepared and tested as disclosed hereinabove. The results are summarized in Table 6.

TABLE 6

| | Parts by Weight (%) | | | | | |
|---|---|---|---|---|---|---|
| Exp. No. | $2CaSO_4.H_2O$ | $Ca(OH)_2$ | $Na_3C_6H_5O_7.2H_2O$ | $Na_2S_2O_5.5H_2O$ | $T_H$ (min) | $R_T$ |
| 1 | 96 | 3.85 | 0.15 | — | 64.0 | 1.0 |
| 2 | 71 | 3.85 | 0.15 | 25 | 52.0 | 0.81 |
| 3 | 66 | 3.85 | 0.15 | 30 | 73.0 | 1.14 |
| 4 | 61 | 3.85 | 0.15 | 35 | 84.0 | 1.31 |
| 5 | 56 | 3.85 | 0.15 | 40 | 102.0 | 1.59 |
| 6 | 51 | 3.85 | 0.15 | 45 | 53.0 | 0.83 |

Wherein $T_H$ and $R_T$ are as disclosed for Table 1.

EXAMPLE 7

A number of experiments were carried out in which a series of mixtures for preparing heat ablative materials based on a mixture of plaster of Paris ($2CaSO_4.H_2O$) and small amounts of the setting retardants calcium hydroxide and sodium citrate dihydrate, as the major ablative component, and zinc nitrate hexahydrate as a hydrated salt additive, were tested to determine the effect of increasing the amount of zinc nitrate hexahydrate in the composition on the time of heat protection. All the heat ablative materials were prepared and tested as disclosed hereinabove. The results are summarized in Table 7.

TABLE 7

| | Parts by Weight (%) | | | | | |
|---|---|---|---|---|---|---|
| Exp. No. | $2CaSO_4.H_2O$ | $Ca(OH)_2$ | $Na_3C_6H_5O_7.2H_2O$ | $Zn_2(NO_3)_2.6H_2O$ | $T_H$ (min) | $R_T$ |
| 1 | 96 | 3.85 | 0.15 | — | 64.0 | 1.0 |
| 2 | 66 | 3.85 | 0.15 | 30 | 51.0 | 0.8 |
| 3 | 61 | 3.85 | 0.15 | 35 | 69.0 | 1.08 |
| 4 | 56 | 3.85 | 0.15 | 40 | 82.0 | 1.28 |
| 5 | 51 | 3.85 | 0.15 | 45 | 58.0 | 0.91 |

Wherein $T_H$ and $R_T$ are as disclosed for Table 1.

EXAMPLE 8

A number of experiments were carried out in which a series of mixtures for preparing heat ablative materials based on a mixture of plaster of Paris ($2CaSO_4.H_2O$) and small amounts of the setting retardants calcium hydroxide and sodium citrate dihydrate, as the major ablative component, and sodium silicate pentahydrate as a hydrated salt additive, were tested to determine the effect of increasing the amount of sodium silicate pentahydrate in the composition on the time of heat protection. All the heat ablative materials were prepared and tested as disclosed hereinabove. The results are summarized in Table 8.

TABLE 8

| | Parts by Weight (%) | | | | | |
|---|---|---|---|---|---|---|
| Exp. No. | $2CaSO_4.H_2O$ | $Ca(OH)_2$ | $Na_3C_6H_5O_7.2H_2O$ | $Na_2SiO_3.5H_2O$ | $T_H$ (min) | $R_T$ |
| 1 | 96 | 3.85 | 0.15 | — | 64.0 | 1.0 |
| 2 | 71 | 3.85 | 0.15 | 25 | 48.0 | 0.75 |
| 3 | 66 | 3.85 | 0.15 | 30 | 72.0 | 1.13 |

TABLE 8-continued

| | Parts by Weight (%) | | | | | |
|---|---|---|---|---|---|---|
| Exp. No. | $2CaSO_4.H_2O$ | $Ca(OH)_2$ | $Na_3C_6H_5O_7.2H_2O$ | $Na_2SiO_3.5H_2O$ | $T_H$ (min) | $R_T$ |
| 4 | 61 | 3.85 | 0.15 | 35 | 75.0 | 1.17 |
| 5 | 56 | 3.85 | 0.15 | 40 | 80.0 | 1.25 |
| 6 | 51 | 3.85 | 0.15 | 45 | 56.0 | 0.88 |

Wherein $T_H$ and $R_T$ are as disclosed for Table 1.

EXAMPLE 9

A number of experiments were carried out in which a series of mixtures for preparing heat ablative materials based on a mixture of plaster of Paris ($2CaSO_4.H_2O$) and small amounts of the setting retardants calcium hydroxide and sodium citrate dihydrate, as the major ablative component, and potassium fluoride dihydrate as a hydrated salt additive, were tested to determine the effect of increasing the amount of potassium fluoride dihydrate in the composition on the time of heat protection. All the heat ablative materials were prepared and tested closed hereinabove. The results are summarized in Table 9.

TABLE 9

| | Parts by Weight (%) | | | | | |
|---|---|---|---|---|---|---|
| Exp. No. | $2CaSO_4.H_2O$ | $Ca(OH)_2$ | $Na_3C_6H_5O_7.2H_2O$ | $KF.2H_2O$ | $T_H$ (min) | $R_T$ |
| 1 | 96 | 3.85 | 0.15 | — | 64.0 | 1.0 |
| 2 | 66 | 3.85 | 0.15 | 30 | 53.0 | 0.83 |
| 3 | 61 | 3.85 | 0.15 | 35 | 66.0 | 1.03 |
| 4 | 56 | 3.85 | 0.15 | 40 | 76.0 | 1.19 |
| 5 | 51 | 3.85 | 0.15 | 45 | 41.0 | 0.64 |

Wherein $T_H$ and $R_T$ are as disclosed for Table 1.

EXAMPLE 10

A number of experiments were carried out in which a series of mixtures for preparing heat ablative materials based on a mixture of plaster of Paris ($2CaSO_4.H_2O$) and small amounts of the setting retardants calcium hydroxide and sodium citrate dihydrate, as the major ablative component, and calcium bromide hexahydrate as a hydrated salt additive, were tested to determine the effect of increasing the amount of calcium bromide hexahydrate in the composition on the time of heat protection. All the heat ablative materials were prepared and tested as disclosed hereinabove. The results are summarized in Table 10.

TABLE 10

| | Parts by Weight (%) | | | | | |
|---|---|---|---|---|---|---|
| Exp. No. | $2CaSO_4.H_2O$ | $Ca(OH)_2$ | $Na_3C_6H_5O_7.2H_2O$ | $CaBr_2.6H_2O$ | $T_H$ (min) | $R_T$ |
| 1 | 96 | 3.85 | 0.15 | — | 64.0 | 1.0 |
| 2 | 66 | 3.85 | 0.15 | 30 | 52.0 | 0.81 |
| 3 | 61 | 3.85 | 0.15 | 35 | 68.0 | 1.06 |
| 4 | 56 | 3.85 | 0.15 | 40 | 73.0 | 1.14 |
| 5 | 51 | 3.85 | 0.15 | 45 | 60.0 | 0.94 |

Wherein $T_H$ and $R_T$ are as disclosed for Table 1.

EXAMPLE 11

A number of experiments were carried out in which a series of mixtures preparing heat ablative materials based on a mixture of plaster of Paris ($2CaSO_4.H_2O$) and small amounts of the setting retardants calcium hydroxide and sodium citrate dihydrate, as the major ablative component, and magnesium nitrate hexahydrate as a hydrated salt additive, were tested to determine the effect of increasing the amount of magnesium nitrate hexahydrate in the composition on the time of heat protection. All the heat ablative materials were prepared and tested as disclosed hereinabove. The results are summarized in Table 11.

TABLE 11

| | Parts by Weight (%) | | | | | |
|---|---|---|---|---|---|---|
| Exp. No. | $2CaSO_4.H_2O$ | $Ca(OH)_2$ | $Na_3C_6H_5O_7.2H_2O$ | $Mg(NO_3)_2.6H_2O$ | $T_H$ (min) | $R_T$ |
| 1 | 96 | 3.85 | 0.15 | — | 64.0 | 1.0 |
| 2 | 66 | 3.85 | 0.15 | 30 | 56.0 | 0.88 |
| 3 | 61 | 3.85 | 0.15 | 35 | 58.0 | 0.91 |
| 4 | 56 | 3.85 | 0.15 | 40 | 68.0 | 1.06 |
| 5 | 51 | 3.85 | 0.15 | 45 | 61.0 | 0.95 |
| 6 | 46 | 3.85 | 0.15 | 50 | 54.0 | 0.84 |

Wherein $T_H$ and $R_T$ are as disclosed for Table 1.

It is noted that, in all the experiments of disclosed hereinabove the maximal time of heat protection was achieved when the hydrated salt additive in the mixture was approximately 40% (p.b.w.).

Table 12 hereinbelow compares the heat of fusion of each of the hydrated salts used in the experiments hereinabove with the value of time of heat protection obtained for heat ablative materials prepared from mixtures including 40% of the hydrated salts, respectively.

It is noted that, experiment 12 of Table 12 hereinbelow is not included in any of the tables hereinabove and was performed as disclosed in the experiments Example 1.

TABLE 12

| Exp. | % (p.b.w) | | | | Formula of Hydrated Salt | | | |
|---|---|---|---|---|---|---|---|---|
| No. | A | B | C | D | of Column D | H | $T_H$ | $R_T$ |
| 1 | 96 | 3.85 | 0.15 | — | — | — | — | 1.0 |
| 2 | 56 | 3.85 | 0.15 | 40 | $LiNO_3.3H_2O$ | 300 | 115 | 1.8 |
| 3 | 56 | 3.85 | 0.15 | 40 | $Na_2CO_3.10H_2O$ | 250 | 112 | 1.75 |
| 4 | 56 | 3.85 | 0.15 | 40 | $Ba(OH)_2.8H_2O$ | 297 | 106 | 1.66 |
| 5 | 56 | 3.85 | 0.15 | 40 | $Na_2S_2O_5.5H_2O$ | 201 | 102 | 1.59 |
| 6 | 56 | 3.85 | 0.15 | 40 | $Ni(NO_3)_2.6H_2O$ | 147 | 82 | 1.28 |
| 7 | 56 | 3.85 | 0.15 | 40 | $Zn(NO_3)_2.6H_2O$ | 147 | 82 | 1.28 |
| 8 | 56 | 3.85 | 0.15 | 40 | $Na_2SiO_3.5H_2O$ | 137 | 80 | 1.25 |
| 9 | 56 | 3.85 | 0.15 | 40 | $KF.2H_2O$ | 110 | 76 | 1.19 |
| 10 | 56 | 3.85 | 0.15 | 40 | $CaBr_2.6H_2O$ | 108 | 73 | 1.14 |
| 11 | 56 | 3.85 | 0.15 | 40 | $Mg(NO_3)_2.6H_2O$ | 92 | 68 | 1.06 |
| 12 | 56 | 3.85 | 0.15 | 40 | $MgCl_2.6H_2O$ | 87 | 52 | 0.81 |

Wherein the column labeled A represents the percentage of plaster of Paris ($2CaSO_4.H_2O$) in the mixture for preparing the heat ablative materials, column B represents the percentage of the setting retardant calcium hydroxide (Ca(OH)$_2$) in the mixture, column C represents the percentage of the setting retardant sodium citrate dihydrate ($Na_3C_6H_5O_7.2H_2O$) in the mixture and column D represents the percentage of the hydrated salt used in the mixture.

H represents the heat of fusion of the hydrated salt in Kilojoulle per Kilogram (Kj/Kg). $T_H$ represents the time of heat protection in minutes, measured as described hereinabove. $R_T$ represents the ratio of the $T_H$ value measured in a particular experiment and the $T_H$ value of the control experiment (experiment No. 1 of Table 1).

The experiments of Table 12 show that hydrated salt additives having a heat of fusion higher than 100 Kilojoule per kilogram (Kj/Kg) promote significant increases of the time of heat protection relative to a heat ablative material prepared from a mixture containing 96% plaster of Paris and the setting retardants calcium hydroxide (3.85%) and sodium citrate dihydrate (0.15%).

It is noted that the time of heat protection of the various heat ablative materials is related to the heat of fusion of the hydrated salt additive. For all the tested samples of Table 12, the higher the heat of fusion of a hydrated salt, the higher is the time of heat protection of the ablative material including that hydrated salt as an additive.

The hydrated salt magnesium chloride hexahydrate has a heat of fusion of 87 Kj/Kg. When this hydrated salt is used as the additive in the mixture for preparing a heat ablative material (experiment 12 of Table 12) the resulting time of heat protection of 52 minutes is actually lower than the time of heat protection of the control heat ablative material (experiment 1 of Table 12) which is 64 minutes.

EXAMPLE 12

Two additional experiments were carried out to test the possibility of modifying the heat ablative materials by including a filler in the mixture, in accordance with another preferred embodiment of the present invention. The filler was Perlite having a grain size of 0.2–3.0 mm, commercially available from Agrical Taasiot, Moshav Habonim, Israel. Two heat ablative materials were prepared and tested as follows:

Mixture A

89% (p.b.w.) plaster of Paris having a mesh size of 100–150 were dry mixed with 11% (p.b.w.) Perlite, water was added and the mixture was mixed as described hereinabove till it was homogeneous and of plastic consistency. The plastic mixture was then cast, hardened and dried as disclosed hereinabove. The hardened tiles had a density of 1.12 g/cm$^3$ and a time of heat protection of 57 minutes.

Mixture B 49.84% (p.b.w) plaster of Paris having a mesh size of 100–150 was dry mixed with calcium hydroxide (3.43% p.b.w.), sodium citrate dihydrate (0.13% p.b.w.) and lithium nitrate trihydrate (35.6% p.b.w.). Perlite (11% p.b.w.) was added to the mixture, water was added, and the mixture was mixed as described hereinabove till it was homogeneous and of plastic consistency. The plastic mixture was then cast, hardened and dried as disclosed hereinabove. The hardened tiles had a density of 1.18 g/cm$^3$ and a time of heat protection of 98 minutes.

It is noted that, while the filler tested in Example 12 hereinabove was Perlite, other fillers can be used for making heat ablative materials, such as expanded vermiculite, organic and mineral fibers, plasticizers and other suitable fillers.

It is further noted that, the mixtures for preparing heat ablative materials and the prepared heat ablative materials disclosed hereinabove can be used as castable or pre-cast ablative insulators, respectively, for protecting containers of fuels, explosives or any other heat sensitive materials. They can also be used for heat protection of metal constructions used in buildings or for the protection of doors and walls that have to withstand intense heat in the case of a fire in the building. The heat ablative materials disclosed hereinabove could also be used as heat ablative insulators in heat resistant safes.

It will be appreciated by persons skilled in the art that the present invention is not limited to what has been particularly shown and described hereinabove. Rather the scope of the present invention is defined only by the claims which follow:

We claim:

1. An ablative material mixture comprising calcium sulfate hemihydrate in an amount of 50–60% parts by weight, hydrated salt selected from the group consisting of: lithium nitrate trihydrate, sodium carbonate decahydrate, barium hydroxide octahydrate, sodium thiosulfate pentahydrate, nickel nitrate hexahydrate, zinc nitrate hexahydrate, sodium silicate pentahydrate, potassium fluoride dihydrate, calcium bromide hexahydrate and magnesium nitrate hexahydrate, in an amount of 30–40% parts by weight, and perlite in an amount of up to 11% parts by weight.

2. A mixture according to claim 1 wherein said hydrated salt has a heat of fusion larger than 100 Kilojoule per kilogram.

3. A mixture according to claim 1 further comprising calcium hydroxide in an amount of up to 5% parts by weight and sodium citrate dihydrate in an amount of up to 0.2% parts by weight, wherein said calcium hydroxide and sodium citrate dihydrate act as setting retardants.

4. A method for preparing a pre-cast form of ablative material for fire and heat protection from a mixture comprising calcium sulfate hemihydrate in an amount of 50–60% parts by weight, hydrated salt selected from the group consisting of: lithium nitrate trihydrate, sodium carbonate decahydrate, barium hydroxide octahydrate, sodium thiosulfate pentahydrate, nickel nitrate hexahydrate, zinc nitrate hexahydrate, sodium silicate pentahydrate, potassium fluoride dihydrate, calcium bromide hexahydrate and magnesium nitrate hexahydrate, in an amount of 30–40% parts by weight, perlite in an amount of up to 11% parts by weight and water, the method comprising:

dry mixing said calcium sulfate hemihydrate, hydrated salt and perlite, obtaining a dry mixture;
  adding the water to said dry mixture in a quantity sufficient to yield a substantially homogenous castable wet mixture;
  casting said castable wet mixture into a suitable mold; and
  drying said pre-cast form.

5. A method according to claim 4 wherein said hydrated salt has a heat of fusion larger than 100 Kilojoule per kilogram.

6. A method according to claim 4 wherein the step of dry mixing includes mixing calcium hydroxide in an amount of up to 5% parts by weight and sodium citrate dihydrate in an amount of up to 0.2% parts by weight, as setting retardants.

7. A heat ablative material prepared by the method of claim 4.

8. A pre-cast form prepared from calcium sulfate hemihydrate in an amount of 50–60% parts by weight, hydrated salt selected from the group consisting of: lithium nitrate trihydrate, sodium carbonate decahydrate, barium hydroxide octahydrate, sodium thiosulfate pentahydrate, nickel nitrate hexahydrate, zinc nitrate hexahydrate, sodium silicate pentahydrate, potassium fluoride dihydrate, calcium bromide hexahydrate and magnesium nitrate hexahydrate, in an amount of 30–40% parts by weight, and perlite in an amount of up to 11% parts by weight.

9. An ablative material comprising calcium sulfate hemihydrate in an amount of 50–60% parts by weight, hydrated salt selected from the group consisting of: lithium nitrate trihydrate, sodium carbonate decahydrate, barium hydroxide octahydrate, sodium thiosulfate pentahydrate, nickel nitrate hexahydrate, zinc nitrate hexahydrate, sodium silicate pentahydrate, potassium fluoride dihydrate, calcium bromide hexahydrate and magnesium nitrate hexahydrate, in an amount of 30–40% parts by weight, perlite in an amount of up to 11% parts by weight, and water.

\* \* \* \* \*